United States Patent
Fuglerud et al.

(10) Patent No.: US 6,716,791 B1
(45) Date of Patent: Apr. 6, 2004

(54) CATALYST FOR THE SYNTHESIS OF AMMONIA FROM HYDROGEN AND NITROGEN

(75) Inventors: Terje Fuglerud, Porsgrunn (NO); Per Torbjørn Skaugset, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/623,975

(22) PCT Filed: Jan. 11, 1999

(86) PCT No.: PCT/NO99/00008

§ 371 (c)(1),
(2), (4) Date: Sep. 11, 2000

(87) PCT Pub. No.: WO99/46038

PCT Pub. Date: Sep. 16, 1999

(30) Foreign Application Priority Data

Mar. 13, 1998 (NO) .................................................. 981118

(51) Int. Cl.⁷ ........................... B01J 23/40; B01J 23/42; B01J 23/58; B01J 23/70; B01J 23/74

(52) U.S. Cl. ........................ 502/338; 502/327; 502/328; 502/330; 502/336; 502/341; 502/351

(58) Field of Search ................................. 502/328, 332, 502/336, 338, 341, 351, 327, 330

(56) References Cited

U.S. PATENT DOCUMENTS

| | | | | |
|---|---|---|---|---|
| 3,243,386 A | * | 3/1966 | Nielsen et al. | 252/455 |
| 3,653,831 A | * | 4/1972 | Burnett | 23/199 |
| 3,839,229 A | | 10/1974 | Senes et al. | 252/455 |
| 3,872,027 A | * | 3/1975 | Christmann et al. | 252/430 |
| 4,009,126 A | * | 2/1977 | McFarland | 252/473 |
| 4,150,063 A | * | 4/1979 | Besozzi et al. | 260/680 E |
| 4,197,281 A | * | 4/1980 | Muenger et al. | 423/359 |
| 4,360,504 A | * | 11/1982 | Blanck et al. | 423/236 |
| 4,590,177 A | * | 5/1986 | Richard et al. | 502/328 |
| 4,608,153 A | * | 8/1986 | Hudson et al. | 208/112 |
| 4,751,210 A | * | 6/1988 | de Agudelo et al. | 502/51 |
| 4,764,499 A | * | 8/1988 | Vanderspurt et al. | 502/258 |
| 4,789,657 A | | 12/1988 | Pernicone et al. | 502/243 |
| 4,828,675 A | * | 5/1989 | Sawyer et al. | 208/57 |
| 4,863,712 A | * | 9/1989 | Twigg et al. | 423/651 |
| 5,140,050 A | * | 8/1992 | Mauldin et al. | 518/715 |
| 5,962,757 A | * | 10/1999 | Milam et al. | 585/444 |
| 6,060,420 A | * | 5/2000 | Munakata et al. | 502/302 |
| 6,136,868 A | * | 10/2000 | Culross et al. | 518/700 |
| 6,319,876 B1 | * | 11/2001 | Maier | 502/178 |

FOREIGN PATENT DOCUMENTS

GB   2 144 336   3/1985

\* cited by examiner

*Primary Examiner*—Cam N. Nguyen
(74) *Attorney, Agent, or Firm*—Wenderoth, Lind & Ponack, L.L.P.

(57) ABSTRACT

The present invention relates to a catalyst for the synthesis of ammonia from hydrogen and nitrogen consisting of iron oxides and promoters where the promoters comprise oxides of both cobalt and titanium in addition to Al, K, Ca and Mg oxides, and where the concentration of cobalt is between 0.1% and 3.0% by weight of metal and the concentration of titanium is between 0.1% and 1.0% by weight of metal.

7 Claims, No Drawings

CATALYST FOR THE SYNTHESIS OF AMMONIA FROM HYDROGEN AND NITROGEN

BACKGROUND OF THE INVENTION

1. Field of the Invention

The present invention relates to a catalyst for the synthesis of ammonia from hydrogen and nitrogen.

2. Description of Related Art

The ammonia synthesis catalyst play an important role in the manufacture of ammonia. It effects both the economics and operating conditions of ammonia plants.

Industrial catalysts for ammonia synthesis must satisfy a number of requirements: high catalyst activity at the lowest possible reaction temperatures in order to take advantage of the favorable thermodynamic equilibrium at low temperatures, good resistance to poisoning by oxygen-, chlorine- and sulphur-containing compounds, long life and high mechanical strength.

In order to save energy the synthesis pressure has been steadily reduced from 250–350 bar to 80–150 bar during the last 30 years due to optimized operation of the synthesis loop made possible by new technology, especially for fabrication of the converter. Improvements in the front end has drastically reduced the content of catalyst poisons (oxygen-, sulphur- and chlorine-containing compounds) in the gas inlet to the converter. However, the drop in synthesis pressure necessitates a three- to four-fold increase in the catalyst volume. The demands upon the catalyst quality has also increased. Apparently small improvements in the catalyst activity may lead to major improvements of the operation of a modern ammonia synthesis loop.

The ammonia synthesis catalyst precursor, the unreduced catalyst, is manufactured by melting iron oxides, mainly magnetite, and oxides or carbonates of Al, K, Ca and Mg, the so-called promoters. The melting is performed in electrical furnaces at a temperature of above 1600° C. The ratio $Fe^{2+}/Fe^{3+}$ in the melt is normally in the range 0.5–0.75. The melt is then poured into metal trays where it solidifies and cools. The solid precursor is then broken up, crushed and sieved to obtain the required grain size.

The precursor is reduced to active iron catalyst "in situ" in the ammonia synthesis converter or used to manufacture the prereduced catalyst by a complete reduction under optimised conditions in a prereduction reactor. This material is pyroforic, but after a skin oxidation of the active surface with oxygen, it can be handled safely in air at ambient temperatures.

The promoters mentioned above, containing Al, K, Ca and Mg, are essential for the formation of a large surface of iron in the reduced catalyst and for the kinetics of ammonia formation.

Since the development of the catalyst started, about 90 years ago, the concentration of these promoters have been optimized to obtain maximum activity and to meet the additional requirement mentioned above. Further improvements seem only possible by adding new promoters, or new combination of promoters.

Cobalt oxide has been used as such a new promoter.

From U.S. Pat. No. 3,839,229 it is known an ammonia synthesis catalyst where cobalt oxide is used as a promoter. The catalyst consists essentially of a solid solution of iron oxide and cobalt oxide and said cobalt oxide is present in an amount of 5 to 10 percent by weight expressed as cobalt. In the catalyst there is further included a promoter selected from the group consisting of alumina, silica, zirconia, magnesia, lime (CaO), potassium oxide and rare earth metal oxides.

Another possible promoter is titanium oxide. Only few catalysts using this promoter have been previously described. S. A. Abdukadyrova et al. have in "Tr.Mosk.Khim.—Tekhnol.Inst. (1970), No. 2, 122–5", described that titanium oxide improves the thermal resistance but reduces the activity.

Titanium oxide used as a structural promoter is described by M. E. Dry et al in "Journal of Catalysis", 6, page:194–199, 1966. Titanium oxide is not so effective as aluminium oxide with regard to surface area. This area and the volume of chemisorbed CO normally increase with promoter content, but in contrast to the other promoters $(Al_2O_3, MgO, CO)$ $TiO_2$ had a maximum in the volume of chemisorbed CO at about 0.5 g atom cation per 100 g atom Fe.

BRIEF SUMMARY OF THE INVENTION

The main object of the present invention was to develop a catalyst for ammonia synthesis with improved activity.

Higher activity could be utilized in two ways: High reaction rate at high ammonia concentrations or higher activity at low temperatures.

The catalyst activity maybe expressed as a rate constant in a rate equation for the synthesis reaction. The rate is a function of temperature, pressure and the composition of the gas, and decreases rapidly with increasing ammonia concentrations. Thus a large fraction of the catalyst volume in a synthesis converter will have ammonia concentration approaching the exit concentration. Hence, to improve the efficiency, increasing the reaction rate at high ammonia concentration is of perticular interest.

As the equilibrium temperature decreases with increasing ammonia concentration, searching higher conversion by increasing the reaction rate at high ammonia concentration also means searching a catalyst will higher activity at low temperature.

The inventors have manufactured a lot of samples of iron oxide based catalysts with various promoters in various concentrations to improve the catalyst activity. In addition to the conventional promoters mentioned above, new promoters have been tested, in particular cobalt- and titanium oxide.

The inventors found that the reaction rate at high ammonia concentration increased with 10–20% when both cobalt- and titanium oxide were used as promoters together with the conventional promoters.

The most preferred catalyst was achieved when the concentration of cobalt was between 0.1% and 3.0% by weight of metal and when the concentration of titanium was between 0.1% and 1.0% by weight of metal.

The atomic ratio $Fe^{2+}/Fe^{3+}$ was between 0.5–0.65.

The present invention will thus in its widest scope comprise a catalyst for the synthesis of ammonia from hydrogen and nitrogen consisting of iron oxides and promoters where the promoters comprise oxides of both cobalt and titanium in addition to Al, K, Ca and Mg oxides.

The invention will be further explained in the example.

DETAILED DESCRIPTION OF THE INVENTION

EXAMPLE

Samples were made by mixing iron ore, mainly magnetite, $Fe_3O_4$, with promoters. These mixtures were then melted in a ceramic crucible in a laboratory furnace. The temperature was kept at about 1600° C. The ratio of $Fe^{2+}/Fe^{3+}$ was adjusted to within 0.5 to 0.65 by adding Fe-metal to the melt.

The melt was than poured into an iron crucible and cooled.

The concentration of the promoters in the samples varied as shown in table I:

TABLE I

| | |
|---|---|
| K | 0.4–0.5 |
| Ca | 1.6–1.8 |
| Mg | 0.3–0.5 |
| Al | 1.5–1.8 |
| Co | 0.10–3.00 |
| Ti | 0.14–0.95 |

The balance being iron oxides with natural impurities. The cooled samples were crushed and sieved to 0.4–0.63 mm particles for testing in a microreactor.

The samples, (10 g each), were tested together with the reference sample in a microreactor. The reference sample was a conventional catalyst with no cobalt- or titanium oxide added.

The samples were reduced in a flow of $H_2$ and $N_2$ in the ratio 3/1 at a space velocity of 33000 1/h. The increase in temperature was 3° C./h from 250° C. to 520° C. and 520° C. was kept for 24 hours to ensure complete reduction.

The samples were then tested at a pressure of 50 bar, space velocity in the range 8000 to 50000 1/h, and temperatures in the range 350° C. to 420° C. The inlet gas was $H_2/N_2=3/1$ with an ammonia concentration of 1.0 to 1.2% (vol.). Exit ammonia concentration was in the range 4 to 9% (vol.).

The data obtained during a period of about 100 hours and after an initial stabilisation of 24 hours or more, were used to calculate parameters in a kinetic model for the reaction. The model was then further used for calculating the relative activity and relative reaction rate at higher ammonia concentration than used in the test. The following table II shows the concentration of cobalt and titanium in the various samples, average relative catalyst activities and predicted relative reaction rate at higher ammonia concentration (20% $NH_3$, 420° C.) calculated by the kinetic model.

TABLE II

| Sample | Co w % | Ti w % | Average Relative Catalyst Activity at 350° C. | Relative Reaction Rate (20% $NH_3$ and 420° C.) | Average Relative Catalyst Activity at 420° C. |
|---|---|---|---|---|---|
| 1 (reference) | 0 | 0.14 (impurity) | 1.0 | 1.0 | 1.0 |
| 2 | 1.38 | 0.14 (impurity) | 1.0 | 1.06 | 1.06 |
| 3 | 2.94 | 0.14 (impurity) | 1.04 | 1.08 | 1.13 |
| 4 | 0.1 | 0.83 | 0.91 | 0.86 | 0.91 |
| 5 | 0.1 | 0.4 | 0.71 | 0.97 | 0.93 |
| 6 | 0.1 | 0.91 | 1.04 | 0.91 | 1.02 |
| 7 | 1.24 | 0.41 | 1.08 | 1.13 | 1.18 |
| 8 | 0.35 | 0.38 | 1.04 | 1.22 | 1.13 |
| 9 | 0.56 | 0.54 | 1.12 | 1.22 | 1.17 |

Table II shows that the relative reaction rate was highest at high concentration of ammonia (20%) when both cobalt oxide and titanium oxide were added as promoters (compare sample 7–9 with sample 1).

Furthermore, the table II shows that by adding either cobalt oxide or titanium oxide alone, together with the other conventional promoters, a lower relative reaction rate at high concentration of ammonia was obtained (compare samples 2–3 and 4–6 with sample 1).

Furthermore, table II shows that the activity was increased a temperatures down to 350° C. when both cobalt- and titanium oxide were added as extra promoters (see sample 7–9).

The example also shows that the activity was increased both at low and high reaction temperature when both cobalt- and titanium oxide were added as promoters.

What is claimed is:

1. An ammonia synthesis catalyst, consisting of iron oxides and promoters, wherein the promoters comprise both a cobalt metal oxide and a titanium metal oxide, in addition to an aluminum metal oxide, a potassium metal oxide, a calcium metal oxide and a magnesium metal oxide, wherein cobalt metal is present at a concentration of from 0.1 to 3.0 wt %, titanium metal is present at a concentration of from 0.1 to 1.0 wt %, aluminum metal is present at a concentration of from 1.5 to 1.8 wt %; potassium metal is present at a concentration of from 0.4 to 0.5 wt %; calcium metal is present at a concentration of from 1.6 to 1.8 wt %; magnesium metal is present at a concentration of from 0.3 to 0.5 wt %, and the balance is iron oxides with natural impurities.

2. The ammonia synthesis catalyst according to claim 1, wherein the iron oxides have an atomic ratio of $Fe^{2+}/Fe^{3+}$ of between 0.5 to 0.65.

3. The ammonia synthesis catalyst of claim 1, wherein cobalt metal is present at a concentration of from 0.35 to 3.0 wt %; titanium metal is present at a concentration of from 0.38 to 0.95 wt %; aluminum metal is present at a concentration of from 1.5 to 1.8 wt %; potassium metal is present at a concentration of from 0.4 to 0.5 wt %; calcium metal is present at a concentration of from 1.6 to 1.8 wt %; magnesium metal is present at a concentration of from 0.3 to 0.5 wt %, and the balance is iron oxides with natural impurities.

4. An ammonia synthesis catalyst, comprising iron oxides and promoters, wherein the promoters comprise both a cobalt metal oxide and a titanium metal oxide, in addition to an aluminum metal oxide, a potassium metal oxide, a calcium metal oxide and a magnesium metal oxide, wherein cobalt metal is present at a concentration of from 0.1 to 3.0 wt %, titanium metal is present at a concentration of from 0.1 to 1.0 wt %, aluminum metal is present at a concentration of from 1.5 to 1.8 wt %; potassium metal is present at a concentration of from 0.4 to 0.5 wt %; calcium metal is present at a concentration of from 1.6 to 1.8 wt %; and magnesium metal is present at a concentration of from 0.3 to 0.5 wt %.

5. The ammonia synthesis catalyst of claim 4, wherein cobalt metal is present at a concentration of from 0.35 to 3.0 wt %; titanium metal is present at a concentration of from 0.38 to 0.95 wt %; aluminum metal is present at a concentration of from 1.5 to 1.8 wt %; potassium metal is present at a concentration of from 0.4 to 0.5 wt %; calcium metal is present at a concentration of from 1.6 to 1.8 wt %; magnesium metal is present at a concentration of from 0.3 to 0.5 wt %, and the balance is iron oxides with natural impurities.

6. The ammonia synthesis catalyst according to claim 4, consisting essentially of iron oxides, cobalt metal oxide, titanium metal oxide, aluminum metal oxide, potassium metal oxide, calcium metal oxide and magnesium metal oxide.

7. The ammonia synthesis catalyst according to claim 4, wherein the iron oxides have an atomic ratio of $Fe^{2+}/Fe^{3+}$ of between 0.5 to 0.65.

* * * * *